(12) United States Patent
Tarodo et al.

(10) Patent No.: US 6,288,918 B1
(45) Date of Patent: Sep. 11, 2001

(54) SWITCHED POWER CONVERTER WITH HOLD-UP TIME AND HARMONICS REDUCTION

(75) Inventors: Antonio Fontan Tarodo, Madrid (ES); Enrique De La Cruz Moreno, Paris (FR); Salvador Ollero Velasco, Madrid (ES)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/440,059

(22) Filed: Nov. 15, 1999

(30) Foreign Application Priority Data

Nov. 16, 1998 (ES) .................................................. 9802399

(51) Int. Cl.[7] ............................................. H02M 1/12
(52) U.S. Cl. ......................... 363/44; 363/86; 363/21.1; 323/209; 323/218
(58) Field of Search ..................... 363/37, 44, 47, 363/48, 39, 89, 127, 125; 307/46, 64, 65, 66; 323/209, 218

(56) References Cited

U.S. PATENT DOCUMENTS

| | | | |
|---|---|---|---|
| 5,535,112 | * | 7/1996 | Vazquez et al. ....................... 363/20 |
| 5,721,481 | * | 2/1998 | Narita et al. ........................... 320/34 |
| 5,781,427 | * | 7/1998 | Moreau ................................. 363/61 |
| 5,796,182 | * | 8/1998 | Martin ................................... 307/66 |
| 5,804,952 | * | 9/1998 | Chen ..................................... 323/255 |
| 5,912,812 | * | 6/1999 | Moriarty, Jr. ......................... 363/89 |
| 5,923,152 | * | 7/1999 | Guerrera ............................... 323/222 |

* cited by examiner

Primary Examiner—Peter S. Wong
Assistant Examiner—Gary L. Laxton
(74) Attorney, Agent, or Firm—Sughrue, Mion, Zinn, Macpeak & Seas, PLLC

(57) ABSTRACT

Switched power converter with hold-up time and harmonics reduction connected to an AC power mains through a first rectifier means (13) and connected to conversion means (19) supplying a regulated voltage.

An energy storage means (16) connected in parallel with the rectifier means (13), absorbs or supplies current to the conversion means (19), by adapting the conducting periods of two switching devices in such a way that determines the voltage level on the storage means (16) and assures a sinusoidal current at input terminals (11, 12).

The two switching devices are switched in a complementary manner by means of a first control means included in the energy storage means (16).

20 Claims, 2 Drawing Sheets

US 6,288,918 B1

SWITCHED POWER CONVERTER WITH HOLD-UP TIME AND HARMONICS REDUCTION

OBJECT OF THE INVENTION

The present invention relates to a switched power converter which is connected to an alternating current (AC) power mains for rectifying the received voltage sine wave and converting it to a voltage level suitable for feeding to at least one load, such as a telecommunications equipment.

For performing the conversion switching elements are employed which are switched at high frequency and, as a result, generate harmonics in the input current, possibly producing distortion that interferes with the normal operation of other devices connected to the AC power mains.

Known techniques, as power factor correction, are used to reduce the harmonics content in the input current, by approximating the input current waveform to a sinusoid, said power factor correction circuits being in general complex.

STATE OF THE ART

At the present time a switched power converter is known for maintaining a high power factor at its input terminals from the U.S. Pat. No. 4,903,181, being incorporated in the present patent application by reference.

According to the power converter proposed in this document, its input terminals are connected to the AC power mains, and it provides across its output terminals a regulated DC voltage. The power converter has a first switching circuit the output of which is connected to an impedance inverting circuit, the two working together as a current generator.

A second switching circuit is connected in parallel with the output of the impedance inverting circuit for obtaining the regulated output voltage of the power converter.

A phase delay controller controls the switching of this second switching circuit and synchronises it with the switching of the first switching circuit, in such a manner that a storage capacitor, which is included in the second switching circuit, is charged for obtaining the second regulated output voltage. The phase delay controller determines the voltage on the storage capacitor.

The first switching circuit comprises means for correcting the power factor obtaining, thereby, a high power factor.

The switched power converter proposed in the patent U.S. Pat. No. 4,903,181 comprises a high number of switching elements, separate control circuits and, consequently, the circuitry of the proposed converter is complex and costly, and in addition, results in a converter that is bulky as a whole, this proving to be a drawback for applications where compact devices are required, this last feature being a major design parameter in the down-sizing of all equipment.

As a consequence, there exists a requirement to develop a switched power converter that comprises a reduced number of switching elements and control circuits, having a reduced harmonics content and a high overall performance, avoiding thereby the aforementioned problems.

SUMMARY OF THE INVENTION

The switched power converter with hold-up time and harmonics reduction of the present invention has a power factor close to unity, a high overall performance and a regulated output voltage; comprises a reduced number of switching devices and has a high integration density and reduced size; and, consequently, the overall cost of the switched power converter is low.

The switched power converter is connected to an AC power mains, comprising a first rectifier means, the input terminals of which are connected to an alternating current (AC) power mains, that produces at its output a rectified voltage sine wave which is applied to a converter means, through conductors (14, 15), that produces a regulated voltage across its output terminals.

A bi-directional energy storage means is connected in parallel with the output of the first rectifier means, for, as required, absorbing or supplying current from or to the input terminals of the converter means, so that the waveform of the input current follows the waveform of the input voltage and maintains constant the voltage level on the energy storage means.

The energy storage means comprises a series combination of a second switching device and a third switching device, connected in parallel with a storage capacitor, and a node between the second switching device and the third switching device is connected through an inductance to the conductor.

A first control means adapts each of the conducting periods of the second switching device and of the third switching device for determining the voltage level of the energy storage means and ensures a sinusoidal current at the input terminals of the power converter, based on a signal representative of the rectified voltage sinusoidal waveform and a signal representative of the storage capacitor voltage.

The first control means swatches the second switching device and the third switching device in a complementary manner.

Thus, the energy storage means supplies or absorbs current at the output of the first rectifier means, achieving a reduction in the harmonics content in the input current to the first rectifier means. As a result, the switched power converter has a power factor close to unity.

The switched power converter of the invention maintains a high power factor at its input, satisfying as a result the international standards, such as the EN-1000-3-2 standard, which relate to the harmonics content in the input current in devices connected to the AC power mains, and its implementation is straightforward.

BRIEF DESCRIPTION OF THE FIGURES

A more detailed explanation of the invention is provided in the following description, based on the figures attached, in which.

DESCRIPTION OF THE INVENTION

Figure 1:
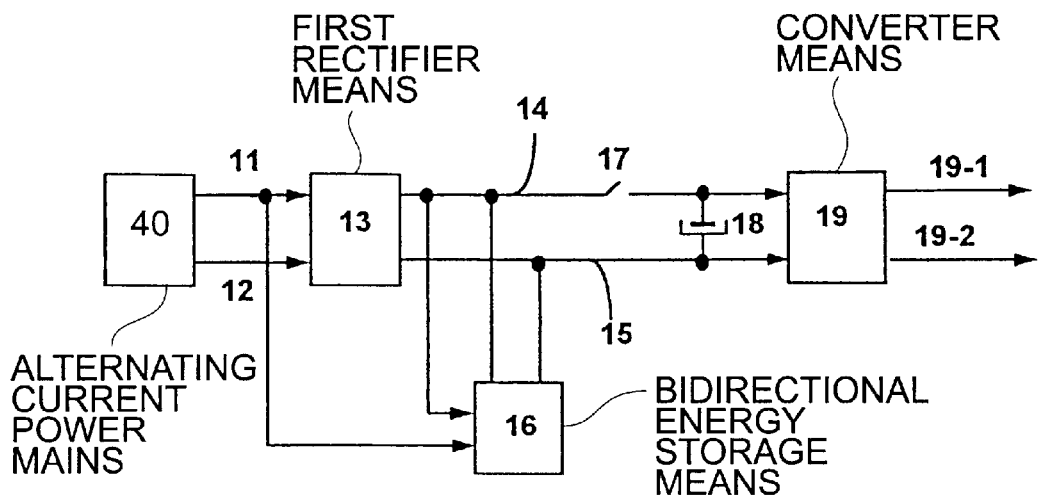
FIG. 1 shows a block diagram of a switched power converter with hold-up time and harmonics reduction according to the invention.

FIG. 1 is a simplified block diagram of a preferred embodiment of the switched power converter with hold-up time and harmonics reduction, comprising input terminals 11 and 12 connected to an alternating current (AC) power mains 40 for supplying power to a first rectifier means 13, for example a full-wave diode rectifier, that produces at its output a rectified sine wave voltage.

The output of the first rectifier means 13 is connected by means of conductors 14 and 15 to the input of at least one converter means 19 for producing at least one regulated DC voltage across its output terminals 19-1 and 19-2, said voltage being applied to a load.

A first switching device 17 is situated between the first rectifier 13 and the converter means 19 on the conductor 14. The first switching device 17 can have a control terminal by which its on and off states, conducting and nonconducting periods, respectively, are controlled.

Across the conductors 14 and 15, and before the first switching device 17, a bi-directional energy storage means 16 is connected for feeding current to line 14 or absorbing current from line 14, in such a manner that the input current is forced to follow a waveform close to a sinusoid, and be in phase with the voltage sinusoidal wave, the harmonics content being reduced in the current supplied from the AC mains 40.

Figure 2:
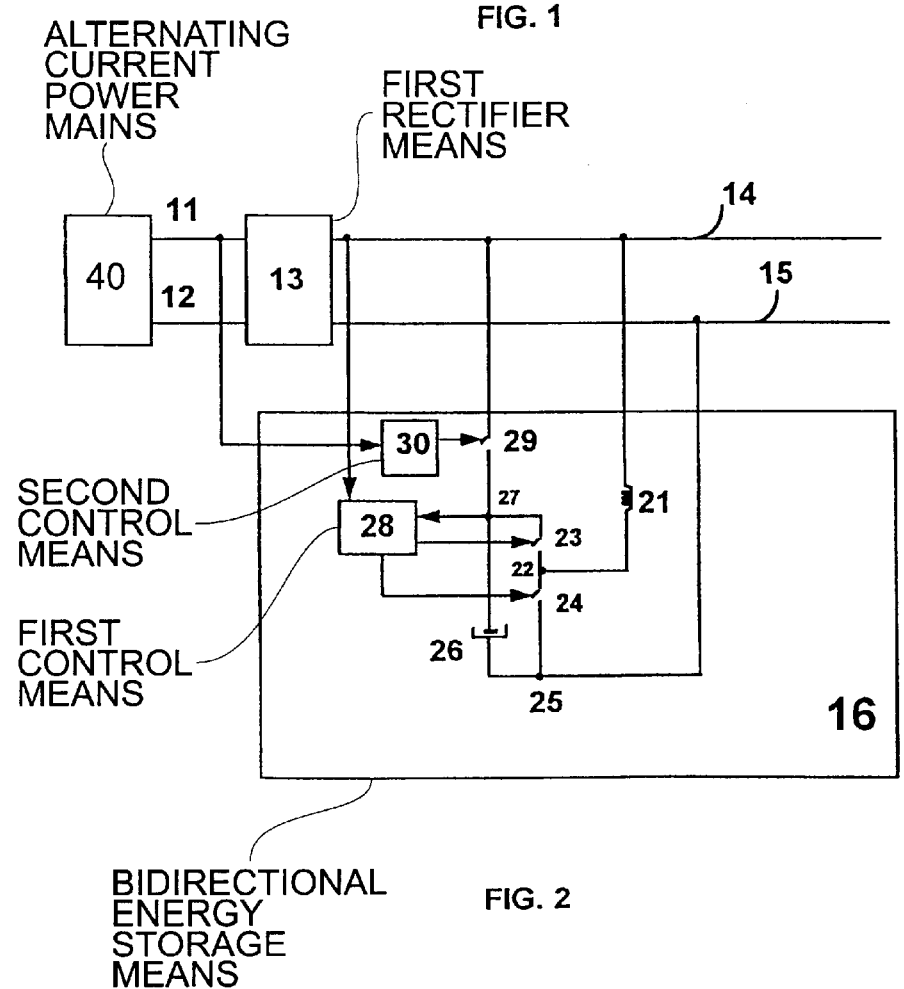
FIG. 2 shows a simplified schematic of an energy storage means according to the invention.

FIG. 2 shows a preferred embodiment of the energy storage means 16, comprising a storage capacitor 26, that may be a battery, being connected in parallel with a series combination of a second and a third switching devices 23 and 24, respectively, each one of them having a control terminal.

An inductance 21 is situated between a first output node 22, situated between the second and third switching devices 23 and 24, respectively, and a node situated on the line 14, before the first switching device 17.

A second output node 25 of the energy storage means 16 is situated between one extremity of the storage capacitor 26 and a terminal of the third switching device 24, and is connected to the conductor 15 that represents the common voltage reference of the switched power converter.

The energy storage means 16 is basically a half bridge arrangement of switching devices, for example field effect transistors of the MOSFET type, which acts as a current generator, and functions as a bi-directional buck-boost converter.

This operation is determined by a first control means 28 that adapts the conducting period of each of the two switching devices 23 and 24, with the purpose of having the input current waveform approximate to a sinusoid and, consequently, having the power factor close to unity.

The first control means 28, therefore, generates the duty cycle of each of the two switching devices 23 and 24 based on a signal representative of the rectified sine wave voltage, taken at the output of the first rectifier means 13, and a signal representative of the voltage on the storage capacitor 26.

The two switching devices 23 and 24 are switched in a complementary manner whereby the current flowing through the inductance 21 can be of either sign, positive or negative, depending of the voltage difference existing between the voltage on the storage capacitor 26 and the voltage on the conductors 14 and 15, the voltage on the storage capacitor 26 being determined by the duty cycle of the two switching devices 23 and 24.

The energy storage means 16 is, consequently, responsible for regulating the input current for forcing it to follow the waveform of the input voltage while maintaining the level of energy constant in the storage capacitor 26. Consequently, the power supplied to the input terminals 11 and 12 is transferred to the load without any being consumed in the energy storage means 16, with the exception of losses.

The storage capacitor 26 is charged to a voltage level greater than the voltage level present at the input of the first rectifier means 13. And thus, when it is necessary to boost the current fed to the line 14, the second switching device 23 is closed for more time than the third switching device 24, and storage capacitor 26 discharges. The current that flows through the inductance 21 has a positive gradient.

On the other hand, when the current fed to the line 14 has to be reduced, the third switching device 24 is closed for more time than the second switching device 25, and storage capacitor 26 charges. The current that flows through the inductance 21 has a negative gradient. The first switching device 17 prevents the storage capacitor 26 from discharging when it is connected to the conductor 15.

A second storage capacitor 18 is connected in parallel at the input of the converter means 19 for filtering the rectified voltage wave at the AC mains 40 frequency, and is small in size.

At the moment a service outage occurs in the AC power mains 40, the storage capacitor 26 is connected to the line 14 through a fourth switching device 29 for supplying the energy stored in it to the converter means 19 in order to continue applying the regulated voltage to the load; consequently, this operating mode, termed hold-up time, is allowed for in the design procedure of the storage capacitor 26.

The switching of this fourth switching device 29 is controlled by means of a control signal produced by a second control means 30, which verifies the presence or absence of the AC mains 40 at the input terminal 11. When the AC mains 40 is absent, the control signal turns the fourth switching device 29 on and the storage capacitor 26 discharges, and the switched power converter continues applying the regulated voltage to the load.

The fourth switching device 29 is arranged on a conductor that connects a third node 27, between the terminal of the storage capacitor 26 and a terminal of the second switching device 23, with the conductor 14.

Figure 3:
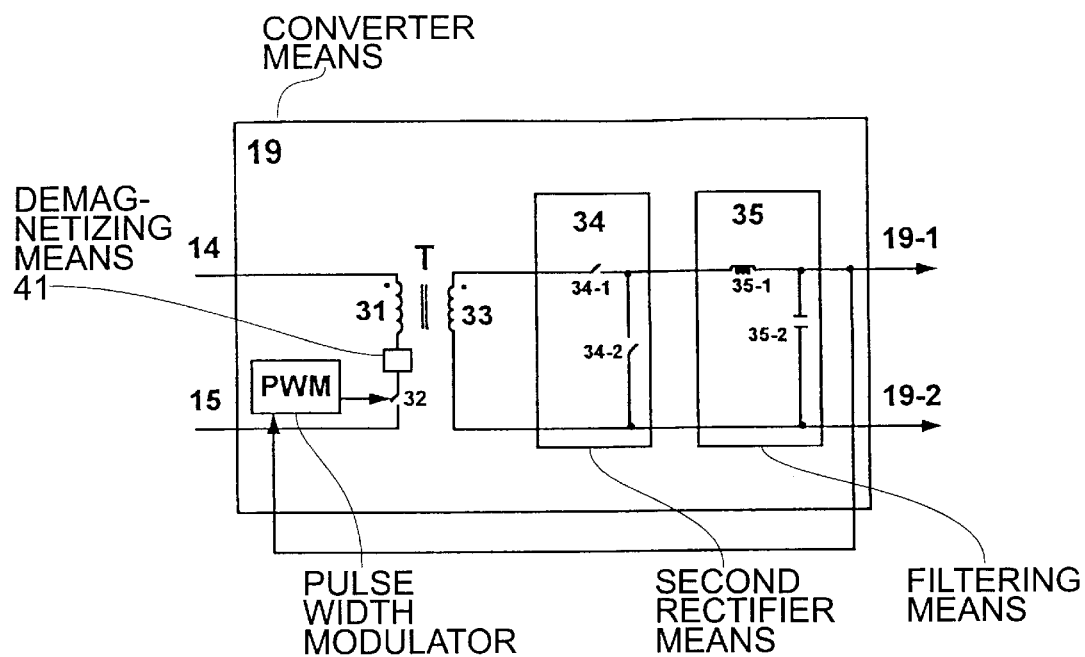
FIG. 3 shows in a schematic a preferred embodiment of a converter means according to the invention

FIG. 3 shows a preferred embodiment of the converter means 19 responsible for regulating the output voltage supplied by the switched power converter of the invention. The converter means 19 are implemented by using a forward converter, with at least one output Said forward topology has been used as an example for explaining the operation of the converter means 19, it being possible to implement them with other topologies with similar results being achieved.

The forward converter 19 comprises a transformer T formed by a primary winding 31 connected in series with a switching means 32, and at least one secondary winding 33 connected to the input of a second rectifier means 34 for rectifying a voltage wave present across the terminals of the secondary winding 33.

The second rectifier means 34 is formed by a first and a second rectifier arms 34-1 and 34-2, respectively, where the first arm 34-1 is the actual rectifier arm and the second arm 34-2 is the free flow rectifier arm, working as a synchronous rectifier, the operation of which is not described as it is known in the state of the art. The second rectifier means 34 can comprises means for operating as a self-driven synchronous rectifier.

The output of the second rectifier means 34 is connected to a filtering means 35 for filtering the output voltage of the second rectifier means 34, the filtered voltage being applied to the load through output terminals 19-1 and 19-2.

The forward converter 19 also comprises an output voltage loop for regulating the voltage supplied to the load. The loop is formed by a control circuit such as a pulse width modulator (PWM) that receives a signal representative of the output voltage on the output terminal 19-1, and generates the duty cycle for the switching means 32, so that the voltage supplied to the load is regulated.

When the switching means 32 is closed, the energy present in the primary winding 31 is transferred directly to the secondary winding 33, a current flowing through the rectifier arm 34-1. And when the switching means 32 is open, a current flows through the free flow arm 34-2, being supplied by an inductor 35-1 which forms part of the filtering means 35 together with a storage capacitor 35-2.

The forward converter 19 comprises a demagnetizing means, 41 connected for example in parallel with the primary winding 31 of the transformer T, it being possible to connect them in other ways to achieve the same function.

The demagnetizing means 41 provide a discharge path for the energy stored in the primary winding 31 for preventing saturation of the core of transformer T. The discharge path is established during the non-conducting period of the switching means 32.

As a result of the operating mode of the converter 19 and of that described above, the switched power converter proposed offers rapid regulation of its output voltage, a high overall performance, a power factor close to unity, large integration density, reduce cost and compact size.

What is claimed is:

1. A switched power converter with hold-up time and harmonics reduction, comprising a first rectifier means, the input terminals of which are connected to an alternating current power mains producing at an output of said first rectifier means a rectified sine wave voltage that is applied to a converter means via a plurality of conductors that produces at least one regulated voltage across output terminals of said converter means; said power converter comprising a bi-directional energy storage means connected in parallel with the output of said first rectifier means for absorbing or supplying current from or to the input terminals of said converter means, so that an input current received via said input terminals is forced to follow the waveform of a voltage received via said input terminals and said converter means maintains constant the voltage level on said energy storage means.

2. The switched power converter according to claim 1, wherein said energy storage means comprises a series combination of a second switching device and of a third switching device, connected in parallel with a storage capacitor, and a node between said second switching device and said third switching device is connected through an inductance to one of said plurality of conductors.

3. Switched power converter according to claim 2, wherein a first control means adapts each of the conducting periods of said second switching device and of said third switching device for determining the voltage level on said energy storage means, based on a signal representative of the rectified sine wave voltage and a signal representative of the voltage on said storage capacitor.

4. Switched power converter according to claim 3, wherein said first control means switches in a complementary manner said second switching device and said third switching device.

5. Switched power converter according to claim 2, wherein said storage capacitor is connected to said conductor fourth switching device.

6. Switched power converter according to claim 5, wherein a second control means adapts the conducting period of said fourth switching device, based on the presence or absence of said AC power mains across said input terminals.

7. Switched power converter according to claim 1, wherein said converter means comprise a transformer having at least one primary winding and a secondary winding; where said primary winding is connected in series with a switching means, said secondary winding is connected to a second rectifier means, and its output is connected in turn to a filtering means; and produce across said output terminals said regulated voltage.

8. Switched power converter according to claim 7, wherein said converter means comprise a control circuit for adapting the switching period of said switching means for maintaining the voltage regulated across said output terminals.

9. Switched power converter according to claim 1, wherein said converter means also comprise a demagnetising means for demagnetising energy stored in the core of said transformer during the non-conducting period of said switching means, that is connected in parallel with said primary winding.

10. Switched power converter according to claim 7, wherein said second rectifier means functions as a self-driven synchronous rectifier.

11. Switched power converter according to claim 1, wherein a first switching device is located between said first rectifier means and said converter means on the conductor, and control terminal for controlling its conducting period.

12. A switched power converter, comprising:
  a first rectifier coupled to receive an input from an AC power mains;
  a bidirectional energy storage device coupled in parallel with said rectifier and to said AC power mains; and
  a converter circuit coupled to outputs of said first rectifier and said bidirectional energy storage device, wherein said switched power converter operates in accordance with a first switch having a first terminal coupled said and converted circuit, and a second terminal coupled to said bidirectional energy storage device and said first rectifier.

13. The switched power converter of claim 12, further comprising a filter coupled in parallel with said converter circuit.

14. The switched power converter of claim 12, wherein said bidirectional energy storage device comprises:
  a first controller circuit that receives an output of said first rectifier and generates a control signal to a switching device;
  a current storage device coupled in parallel and operating in accordance with said switching device; and
  a two-way inductor that stores current in accordance with an input level of said AC power mains and is coupled to a first terminal of a second controller, wherein a second terminal of said second controller is coupled to said AC power mains.

15. The switched power converter of claim 14, further comprising:
  a first conductor, coupled to said first rectifier at a first terminal and said converter circuit at a second terminal, that conducts a reference voltage;
  a second conductor coupled to said storage device and said first switch at a first terminal and said first rectifier at a second terminal; and
  a third conductor coupled to said two-way inductor at a first terminal and said first switch at a second terminal.

16. The switched power converter of claim 12, wherein said converter circuit comprises:
  a transformer having a first winding and a second winding, said first winding coupled between said first switch and a second switch, said second switch coupled to a pulse width modulator;

a demagnetizer coupled in parallel with said first winding and having a first terminal coupled to said first switch and a second terminal coupled to a reference voltage;

a second rectifier coupled to said second winding of said transformer; and a filter coupled between said second rectifier and an output of said switched power converter.

17. The switched power converter of claim 16, wherein said second rectifier comprises a third switch coupled between said second winding and said filter, and a fourth switch coupled in parallel with ends of said second winding.

18. The switched power converter of claim 16, wherein said filter comprises an inductor coupled between said output and said second rectifier, and a third switch coupled in parallel with said second winding.

19. The switched power converter of claim 14, wherein said switching device comprises a second switch and a third switch coupled in series and having a control terminal coupled to said first controller circuit, said second and third switch operating a complementary manner.

20. The switched power converter of claim 16, wherein said second rectifier comprises a self-driven synchronous rectifier.

* * * * *